(12) United States Patent
Sheehan et al.

(10) Patent No.: US 6,785,943 B2
(45) Date of Patent: *Sep. 7, 2004

(54) INDEXING TOOL TURRET

(75) Inventors: Terrence Sheehan, Elmira, NY (US); Stephen M. Wightman, Campbell, NY (US); Jacek Mierzejewski, Horseheads, NY (US); Gary Comstock, Gillette, PA (US)

(73) Assignee: Hardinge, Inc., Elmira, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/389,051

(22) Filed: Sep. 2, 1999

(65) Prior Publication Data

US 2001/0039706 A1 Nov. 15, 2001

Related U.S. Application Data

(60) Provisional application No. 60/099,295, filed on Sep. 4, 1998.

(51) Int. Cl.$^7$ .............................................. B23B 39/20
(52) U.S. Cl. ............................ 29/40; 29/42; 29/48.5 A; 74/814; 74/396; 74/822
(58) Field of Search ............................... 29/42, 40, 39, 29/48.5 A, 48.5 R; 74/814, 822, 396

(56) References Cited

U.S. PATENT DOCUMENTS

| | | | | |
|---|---|---|---|---|
| 1,703,218 A | * | 2/1929 | Wegner ......................... | 74/396 |
| 3,896,888 A | * | 7/1975 | Badcock ....................... | 173/109 |
| 3,968,415 A | | 7/1976 | Hafla et al. | |
| 4,177,696 A | * | 12/1979 | Moss ............................ | 74/826 |
| 4,429,443 A | | 2/1984 | Kölblin et al. ............... | 29/26 A |
| 4,524,655 A | | 6/1985 | Waldron et al. | |
| 4,580,460 A | * | 4/1986 | Chang et al. .................. | 74/396 |
| 4,656,708 A | | 4/1987 | Smith et al. ................... | 29/40 |

(List continued on next page.)

FOREIGN PATENT DOCUMENTS

| | | |
|---|---|---|
| DE | 26 40 189 A | 3/1978 |
| DE | 90 03 729 U | 7/1990 |

(List continued on next page.)

OTHER PUBLICATIONS

Dmitriev, N. M.; "New Turret Designs For NC Machine Tools"; Russian Engineering Research, US, Allerton Press, New York; vol. 13, No. 2; pp 97–100.

*Primary Examiner*—Erica Cadugan
(74) *Attorney, Agent, or Firm*—Pillsbury Winthrop LLP

(57) ABSTRACT

An indexing tool turret assembly is disclosed including a rotatable indexable turret tooling plate having mounted thereon stationary as well as live tooling. A single drive motor is utilized in order to perform indexing as well as to drive the live tooling. A plurality of live tools can be simultaneously mounted on the turret tooling plate and the single drive motor is selectively engageable with each of the live tools so that only one of the plurality of live tools is driven at a given time. The selective live tool drive train includes an axially movable drive shaft and bevel drive gear for selectively engaging the driven bevel gear of the desired live tool. The axially movable shaft assembly includes a mechanism for adjusting the backlash between the driving and driven bevel gears when these gears are engaged with one another. The turret assembly further includes a clutch for selectively engaging the single drive motor to index the turret tooling plate and a torque limiter provided in the indexing drive train to disengage the indexing drive in the event of a torque overload occurring during indexing.

40 Claims, 7 Drawing Sheets

U.S. PATENT DOCUMENTS

| | | |
|---|---|---|
| 4,661,038 A | 4/1987 | Kohler et al. ............... 414/730 |
| 4,683,786 A | 8/1987 | Kersten et al. .................. 82/2 |
| 4,785,513 A * | 11/1988 | Lee et al. ....................... 29/40 |
| 4,843,691 A | 7/1989 | Hafla et al. .................... 29/36 |
| 4,847,960 A | 7/1989 | Hafla et al. .................... 29/40 |
| 4,989,303 A * | 2/1991 | Sauter et al. ............ 29/48.5 A |
| 4,991,474 A | 2/1991 | Thumm et al. ............... 82/159 |
| 5,007,151 A | 4/1991 | Gusching ....................... 29/33 |
| 5,007,314 A | 4/1991 | Hafla et al. ................... 82/120 |
| 5,031,490 A | 7/1991 | Grossmann .................. 82/124 |
| 5,093,973 A * | 3/1992 | Steinbach ...................... 29/39 |
| 5,117,544 A | 6/1992 | Kousaku et al. ............... 29/27 |
| 5,123,149 A | 6/1992 | Togawa et al. .......... 29/48.5 R |
| 5,125,142 A * | 6/1992 | Kosho et al. ................... 29/40 |
| 5,146,663 A | 9/1992 | Buessinger .................... 29/40 |
| 5,161,290 A * | 11/1992 | Hashimoto et al. ............ 29/40 |
| 5,190,421 A * | 3/1993 | Wen et al. .................... 408/56 |
| 5,242,360 A | 9/1993 | Bayer ........................... 483/36 |
| 5,341,551 A | 8/1994 | Brown et al. .................. 29/40 |
| 5,383,261 A | 1/1995 | Yamamoto et al. ............ 29/40 |
| 5,386,743 A | 2/1995 | Su et al. ....................... 74/813 |
| 5,418,440 A | 5/1995 | Sakaguchi et al. .......... 318/560 |
| 5,455,993 A | 10/1995 | Link et al. ..................... 29/40 |
| 5,490,307 A | 2/1996 | Link ............................. 29/27 |
| 5,535,496 A * | 7/1996 | Sugino et al. .................. 29/39 |
| 5,632,075 A * | 5/1997 | De Bernardi et al. ........... 29/40 |
| 5,657,523 A | 8/1997 | Lin et al. ................. 29/48.5 A |
| 5,727,297 A * | 3/1998 | Sahm et al. .................... 29/40 |
| 5,730,691 A | 3/1998 | Tokura et al. ................ 483/56 |
| 5,745,967 A * | 5/1998 | Kojima .......................... 29/40 |
| 5,758,399 A | 6/1998 | Sahm et al. ............. 29/48.5 A |
| 5,765,456 A | 6/1998 | Grossmann ................. 82/1.11 |
| 5,768,757 A | 6/1998 | Link ....................... 29/48.5 R |
| 5,787,560 A | 8/1998 | Schalles ........................ 29/36 |
| 5,842,392 A * | 12/1998 | Pfeifer et al. ................ 82/1.11 |

FOREIGN PATENT DOCUMENTS

| | | |
|---|---|---|
| DE | 39 04 631 A | 8/1990 |
| DE | 19642975 | 11/1997 |
| EP | 0 214 090 A | 3/1987 |
| EP | 742063 | 11/1996 |
| EP | 764499 | 3/1997 |
| FR | 2 704 789 A | 11/1994 |
| GB | 2057928 | 4/1981 |
| GB | 2111873 | 7/1983 |
| GB | 2 126 134 A | 3/1984 |
| JP | 59069250 | 8/1984 |
| WO | WO 98/25729 * | 6/1998 |

* cited by examiner

INDEXING TOOL TURRET

CROSS REFERENCE TO RELATED APPLICATIONS

This application claims the benefit of U.S. Provisional Application No. 60/099,295, filed Sep. 4, 1998.

FIELD OF THE INVENTION

The present invention relates to an indexing turret assembly for a machine tool and more particularly, to an indexing turret assembly having provisions for mounting both stationary and live tooling.

DESCRIPTION OF THE PRIOR ART

Indexing turret assemblies have found widespread use in the machine tooling industry. Such assemblies are capable of selectively positioning a plurality of diverse tools into proper alignment with a workpiece so as to allow sequential machining operations to be performed thereon.

The most common types of indexing turret assemblies are those which support tools suitable for turning operations wherein the tools are stationary with respect to a revolving workpiece or those which support tools suitable for milling, drilling, tapping, etc., wherein the tools are rotatably driven with respect to a non-rotating workpiece.

There are also indexing turret assemblies capable of supporting combinations of stationary and live tooling. Such indexing turret assemblies serve to increase the overall flexibility of the machine tool by allowing greater diversity in the machining operations.

One such machine tool is disclosed by Kolblin in U.S. Pat. No. 4,429,443. Kolblin discloses the use of an indexing turret assembly for supporting stationary as well as live tooling and includes a live tooling engagement device movable between a decoupled position and a coupled position by means of a piston and cylinder arrangement. One shortcoming associated with the Kolblin apparatus is that the live tooling drive units are separate from the indexing drive units, thus adding to the overall complexity of the turret assembly.

Smith, U.S. Pat. No. 4,656,708, owned by the same assignee as the present invention, discloses the use of an indexing turret assembly utilizing a single drive motor to provide angular rotation of the turret plate for indexing, as well as for providing the drive to the live tooling mounted on the turret. Hydraulic pressure is used to disengage the turret plate and allow the turret plate to rotate with respect to the rest of the turret. A pneumatic clutch can then be engaged to rotate the turret plate with the single drive motor until the desired tool is indexed. The turret plate is then reengaged with the turret and the clutch disengaged to allow the single drive motor to drive the live tooling.

Link, U.S. Pat. No. 5,490,307, also discloses an indexing turret assembly utilizing a single drive motor for both indexing the turret and driving the live tooling. As with Smith, hydraulic pressure is used to disengage the turret plate and allow the turret plate to rotate with respect to the rest of the turret. The single drive motor is then used to rotate the turret plate until the desired tool is indexed. However, when the turret plate is reengaged with the turret, the drive to the turret plate automatically disengages so that the single drive motor can then be used to drive the live tooling.

Hafla, U.S. Pat. No. 4,847,960 also discloses an indexing turret assembly utilizing a single drive motor for both indexing the turret and driving the live tooling. Hafla does not disengage the turret plate from the turret to index the desired tool, but uses a disengageable planetary gear arranged with the live tool bevel drive gear to index the turret.

In Smith, Link and Hafla, the single live tool bevel drive gear is always engaged with all live tooling installed in the turret plate. Thus, where more than one live tool is installed in the turret plate, all live tools installed in the turret plate will be driven when any live tool is driven. There is a substantial loss of power in driving all live tools simultaneously when it is necessary to drive only the live tool indexed to perform an operation on a workpiece. This can require a higher capacity drive unit than would otherwise be required if only one live tool is driven at a single time or can result in insufficient power being available to properly drive the live tool performing an operation. None of Smith, Link or Hafla allows the selective driving of any single one of a plurality of live tools installed at a given time.

SUMMARY OF THE INVENTION

The present invention provides a turret assembly including a rotatable indexable turret tooling plate having mounted thereon stationary as well as live tooling and wherein a single drive motor is utilized in order to perform indexing (angular rotation of the turret tooling plate) as well as to drive the live tooling. A plurality of live tools can be simultaneously mounted on the turret tooling plate and the single drive motor is selectively engageable with each of the live tools so that only one of the plurality of live tools is driven at a given time. The selective live tool drive train includes an axially movable drive shaft and bevel drive gear for selectively engaging the driven bevel gear of the desired live tool. The axially movable shaft assembly includes a mechanism for adjusting the backlash between the driving and driven bevel gears when these gears are engaged with one another. The turret assembly further includes a clutch for selectively engaging the single drive motor to index the turret tooling plate and an encoder mechanism activated during the indexing operation in order to allow precise tracking of the turret tooling plate during the rotation thereof. A torque limiter is provided in the indexing drive train to disengage the indexing drive in the event of a torque overload occurring during indexing, such as may occur if the turret tooling plate or a tool mounted thereon strikes another object (workpiece, other turret, etc.). The drive motor is variable speed and reversible in order to allow bi-directional indexing following the shortest path and further allowing the live tooling to be bi-directionally driven at variable speeds.

It is therefore an object of the present invention to provide an indexable turret assembly capable of supporting stationary as well as live tooling.

It is also an object of the present invention to provide a turret assembly having an indexable turret tooling plate capable of supporting live tooling and having a single drive unit responsible for driving the live tooling as well as for causing angular displacement of the turret tooling plate during indexing.

It is another object of the present invention to provide a turret assembly having a live tool drive train that is engageable to selectively drive only a single one of a plurality of live tools mounted on the turret tooling plate.

It is another object of the present invention to provide a turret assembly having a selective live tool drive train that includes an axially movable drive shaft and bevel drive gear for selectively engaging the driven bevel gear of the desired live tool and wherein the axially movable shaft assembly includes a mechanism for adjusting the backlash between the driving and driven bevel gears when these gears are engaged with one another.

It is another object of the present invention to provide a turret assembly that includes a clutch for selectively engaging the single drive motor to index the turret tooling plate.

It is another object of the present invention to provide a turret which includes a torque limiter in the indexing drive train to disengage the indexing drive in the event of a torque overload occurring during indexing, such as may occur if the turret tooling plate or a tool mounted thereon strikes another object.

It is another object of the present invention to provide an indexable turret assembly including a variable speed reversible motor drive unit allowing bi-directional indexing following the shortest path and further including reversible bi-directionally driven live tooling.

It is another object of the present invention to provide a turret assembly having an indexable turret tooling plate and encoder mechanism for accurately tracking angular displacement of the turret tooling plate during indexing thereof.

The foregoing and other objects, features, characteristics and advantages of the present invention as well as the methods of operation and functions of the related elements of structure, and the combination of parts and economies of manufacture, will be apparent from the following detailed description and the appended claims, taken in connection with the accompanying drawings, all of which form a part of the specification, wherein like reference numerals designate corresponding parts in the various figures.

DETAILED DESCRIPTION OF THE INVENTION

Figure 1:
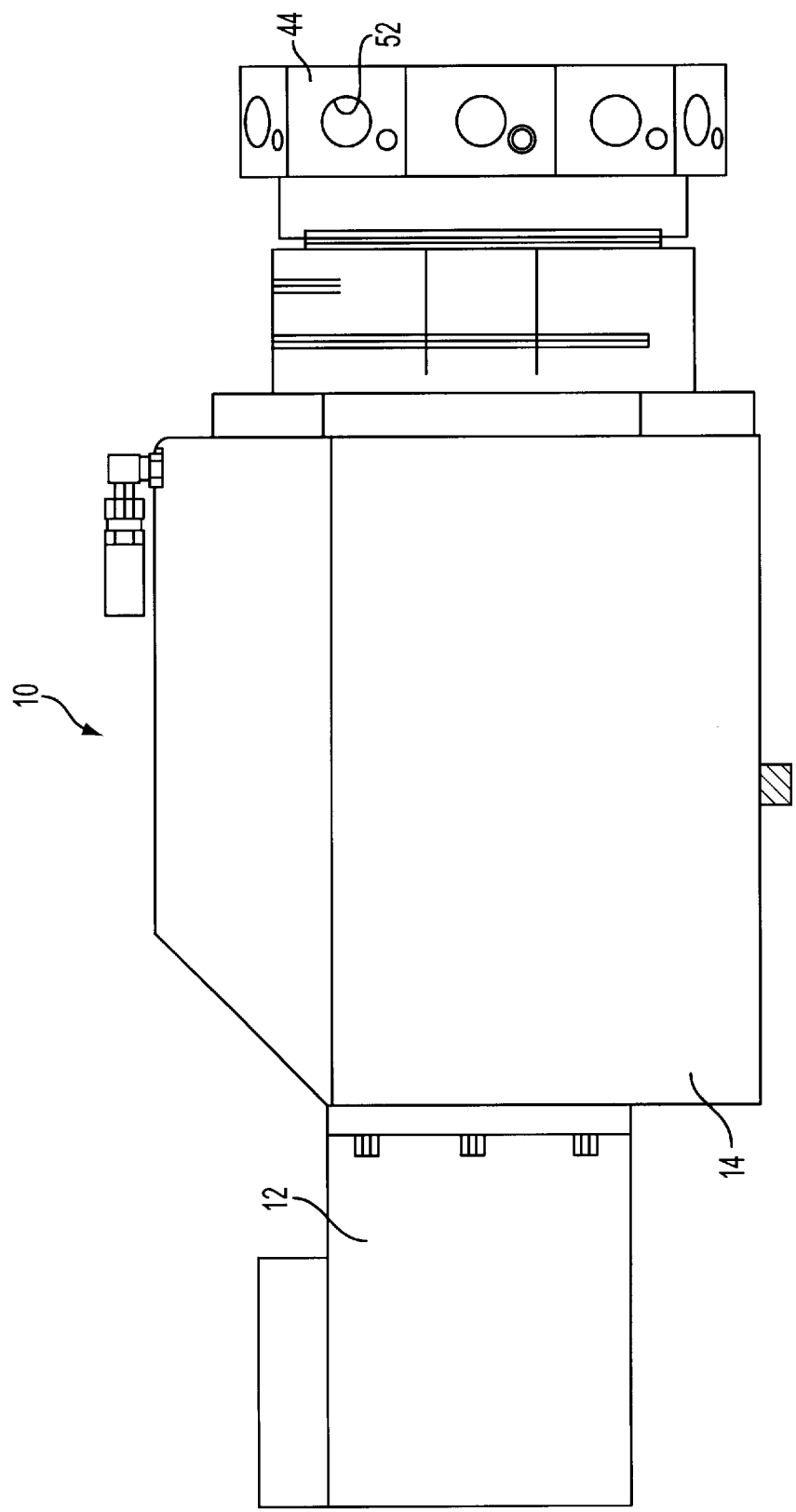
FIG. 1 is a side elevational view of the indexing tool turret of the present invention.
Figure 2:
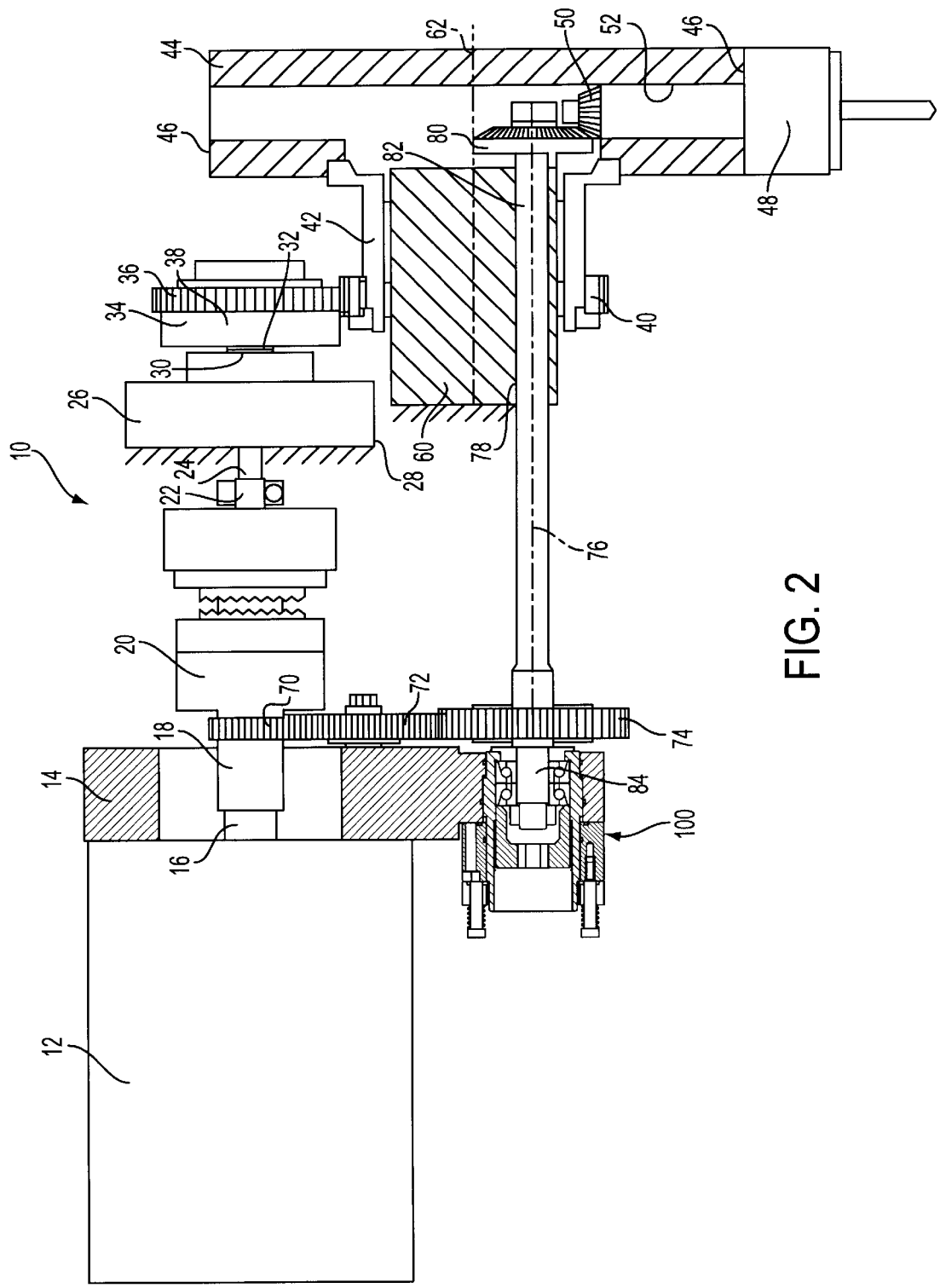
FIG. 2 is a partial sectional view of the indexing tool turret of the present invention showing the tooling turret in an engaged position.
Figure 3:
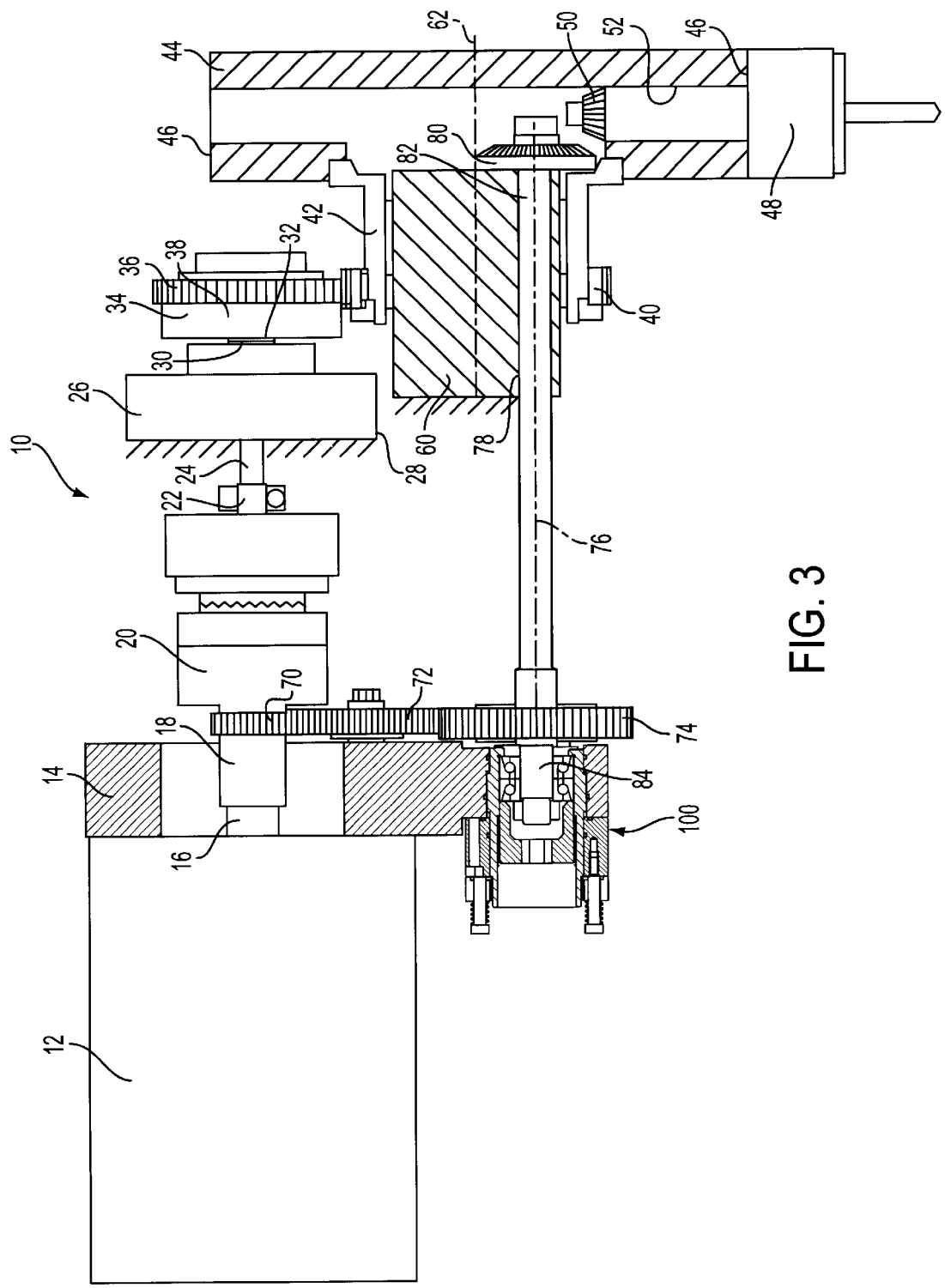
FIG. 3 is a partial sectional view of the indexing tool turret of the present invention showing the tooling turret in a retracted position.

As can be seen in FIGS. 1, 2 and 3, an indexing tool turret according to the present invention is generally indicated at 10. The tool turret 10 includes a drive unit 12 mounted to a tool turret housing 14. In the preferred embodiment, the drive unit 12 is a variable speed, reversible electrical spindle motor, but other conventional types of drive units, including hydraulic and pneumatic units can be used. The drive unit 12 includes a drive shaft 16 conventionally connected to an input shaft 18 of a clutch mechanism 20. Clutch mechanism 20 also includes an output shaft 22. The clutch mechanism 20 is of a pneumatic type. The clutch mechanism 20 is available as model no. 5H20P from Horton Industrial Products, Inc. of Minneapolis, Minn. Other types of alternative clutch mechanisms can also be utilized.

The output shaft 22 of the clutch mechanism 20 is conventionally connected to an input shaft 24 of a speed reduction mechanism 26. A housing 28 of the speed reduction mechanism 26 is attached to the tool turret housing 14. The speed reduction mechanism 26 also includes an output shaft 30. The speed reduction mechanism is available as model no. M03 from the Mectrol Corporation of Salem, N.H. Other types of alternative speed reduction mechanisms can also be utilized.

The output shaft 30 of the speed reduction mechanism 26 is conventionally connected to an input side 32 of a torque limiting mechanism 34. A drive gear 36 is conventionally attached to a housing 38 of torque limiting mechanism 34. The torque limiting mechanism 34 is available as model no. SKL-75 from Gam/Jakob Enterprises of Chicago, Ill. Other types of alternative torque limiting mechanisms can also be utilized.

Drive gear 36 is operatively engaged with a drive gear 40 conventionally attached to an index shaft 42 connected to tooling plate 44. In the preferred embodiment, the gear engages keyed slots on the index shaft 42 and is retained by a nut engaging a threaded portion of the index shaft. Tooling plate 44 includes a plurality of tool stations 46 for mounting tools 48. The tools 48 can be stationary or live, of the customary types. As seen in FIG. 2, the tool 48 mounted in the lower tool station 46 is of a live type and can be utilized for drilling operations. Tool 48 includes a bevel drive gear 50 for positioning in bore 52 of the lower tool station 46. Index shaft 42 and tooling plate 44 are conventionally rotationally mounted on a hub 60 of tool turret housing 14 to rotate about an axis 62. In the preferred embodiment, bearings or bushings are used to rotationally mount tooling plate 44 on hub 60.

A lifting mechanism, discussed below and shown in FIG. 7 but not FIG. 2, is connected to the tooling plate 44 to raise the tooling plate from the lowered locked index position seen in FIG. 2 to a raised rotatable position (i.e., toward the right along axis 62, as seen in FIG. 3) during indexing of the tooling plate 44. Drive gear 40 is wider than drive gear 36 so that even when the tooling plate 44 is in the raised rotatable position, the proper mesh engagement between the two drive gears is maintained.

A drive gear 70 is conventionally attached to input shaft 18 of clutch mechanism 20. Drive gear 70 is operatively engaged with an idler gear 72 rotationally attached in a conventional manner to turret housing 14. Idler gear 72 is operatively engaged with a tool driveshaft gear 74 attached to tool driveshaft 76. Tool driveshaft 76 is rotationally mounted in a bore 78 in hub 60. In the preferred embodiment, bearings or bushings are used to rotationally mount driveshaft 76 in bore 78. A bevel drive gear 80 is conventionally attached to an end 82 of tool driveshaft 76 and is adapted for operative engagement with bevel drive gear 50 of live tool 48. In the preferred embodiment, bevel drive gear 80 engages a keyed slot on driveshaft 76 and is retained by a nut engaging a threaded portion of the driveshaft.

A tool driveshaft retracting mechanism, generally indicated at 100, is attached to an end 84 of tool driveshaft 76. Tool driveshaft retracting mechanism 100 is adapted to axially move tool driveshaft 76 in bore 78 from an engaged position (to the right, as seen in FIG. 2), to a retracted position (to the left, as seen in FIG. 3). In the engaged position, the bevel drive gear 80 is operatively engaged with live tool drive gear 50. In the retracted position, the bevel drive gear 80 is disengaged from live tool drive gear 50. Drive gear 74 is wider than idler gear 72 so that the proper mesh engagement between the two gears is maintained regardless of whether the tool driveshaft 76 (and thus drive gear 74) is in the engaged position or the retracted position.

Figure 4:
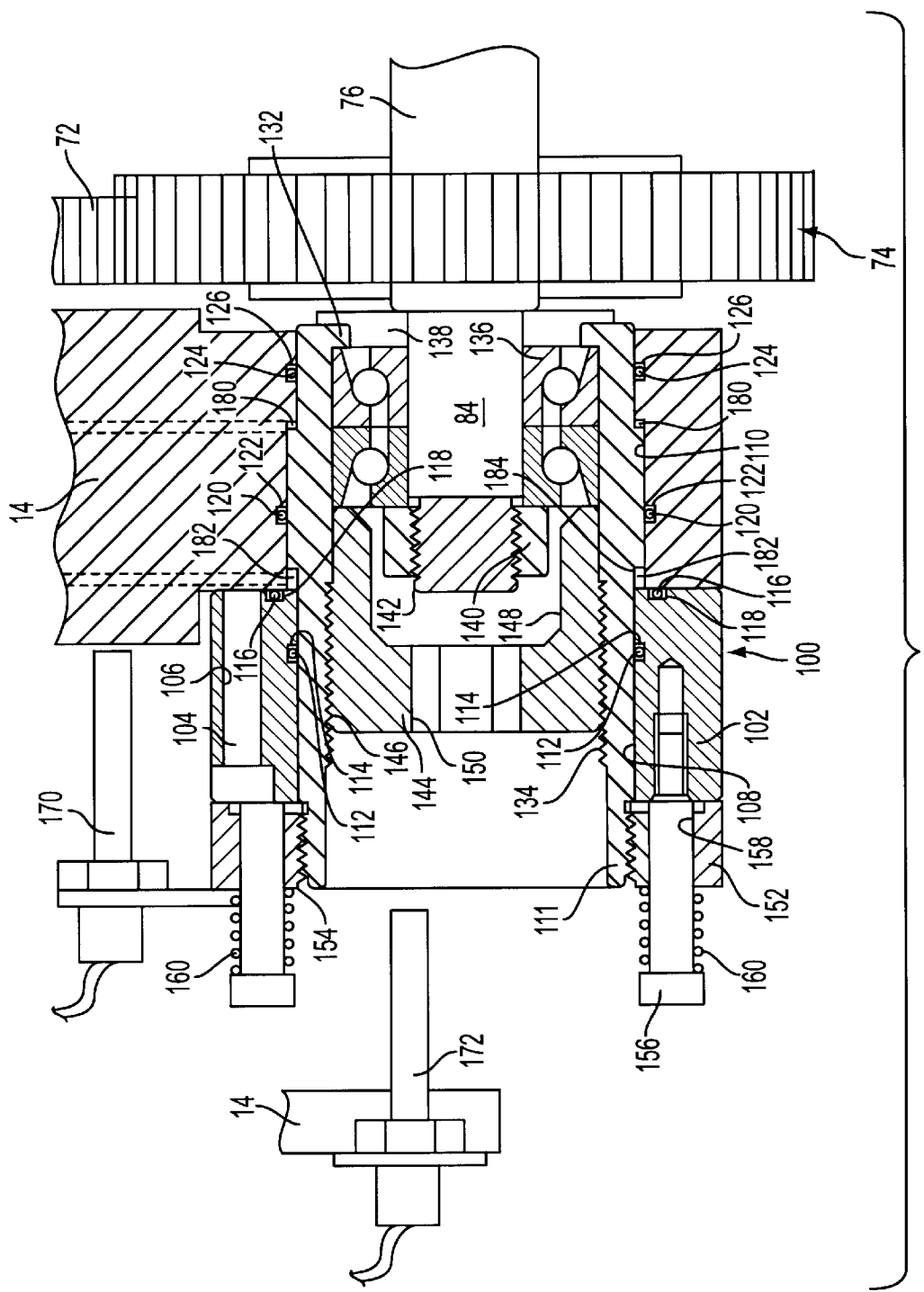
FIG. 4 is a detailed sectional view of the tool driveshaft retracting mechanism of the present invention.

As can be seen in FIG. 4, a housing 102 of driveshaft retracting mechanism 100 is mounted to the turret housing 14 by a plurality of screws 104 passing through a plurality of bores 106. Housing 102 includes an interior bore 108 which is concentric with a stepped bore 110 in turret housing 14 when housing 102 is mounted to turret housing 14. Although positioning bore 108 directly in the turret housing 14 is presently the preferred embodiment, the bore could also be positioned in a replaceable sleeve mounted to housing 14. A piston 111 adapted for sliding and rotating movement in bores 108 and 110 is disposed in the bores. Seal 116 disposed in groove 118 maintains a sealing relationship between the housing 102 and turret housing 14 and between the housings and the piston 111. Seals 112, 120 and 124 disposed in grooves 114, 122 and 126, respectively, maintain a seal relationship between the housings and the piston 111.

Piston 111 includes an interior bore 130, a lip 132 at one end of the bore and a threaded portion 134 of interior bore 130. A set of angular contact bearings 136 are disposed in the piston interior bore 130 seated against lip 132 for rotationally supporting drive shaft 76. A seal/spacer 138 disposed between bearings 136, lip 132 and driveshaft 76, shields contaminants from the interior of retracting mechanism 100 and provides axial clearance between the drive gear 74 and the housing 14. A nut 140 engages threaded portion 142 of driveshaft 76 to secure the driveshaft 76 to the retracting mechanism and to secure inner races of the bearings 136 to the piston 111.

An internal nut 144 includes an externally threaded portion 146 for engaging threaded portion 134 of piston 111 to secure outer races of the bearings 136 to the piston 111. The interior nut also includes a recessed interior portion 148 for providing clearance between the interior nut 144 and the nut 140/driveshaft 76 and a hexagonally shaped bore 150 for engagement with a hex tool (not shown). The hex tool can thus be used to removably install the interior nut 144 in piston 111 as well as to rotate piston 111 after the nut 144 is tightened against the outer races of the bearings 136.

Figure 5:
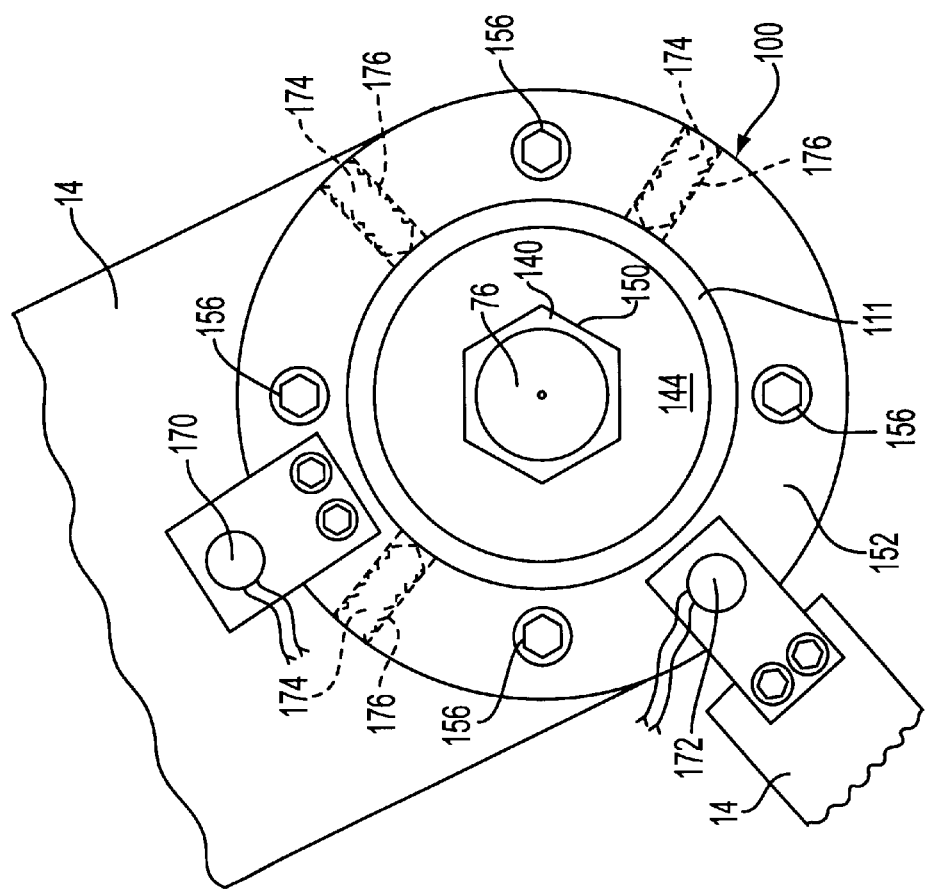
FIG. 5 is an end elevational view of the tool driveshaft retracting mechanism of the present invention.

A threaded collar 152 engages an externally threaded portion 154 of piston 111. A plurality of shouldered screws 156 disposed in bores 158 of collar 152 are used to retain the collar 152 to the housing 102 and prevent rotation of the collar 152. A compression spring 160 is disposed between each screw 156 and the collar 152 to bias the collar 152 against the housing 102 while still allowing a predetermined range of axial motion of the collar 152 and thus, the driveshaft 76 and bevel drive gear 80. A plurality of adjustable threaded set screws 174 are disposed in a plurality of threaded radial bores 176 in the collar 152 (shown in phantom in FIG. 5) for engaging piston 111 and locking the piston 111 with respect to the collar 152. In the preferred embodiment, the setscrews are made of a softer material than the piston so as not to damage the piston surface.

An engagement sensor 170 is attached to the collar 152 and is adapted for sensing its proximity to a portion of the turret housing 14 to sense when the bevel drive gear 80 is in the engaged position with bevel drive gear 50. A retract sensor 172 is attached to the turret housing 14 and adapted for sensing its proximity to the collar 152 to sense when the bevel drive gear 80 is in the retracted position and disengaged with bevel drive gear 50. Both sensors are conventionally adjustable to adjust their sensing positions. In the preferred embodiment, proximity sensors are used which do not have moving parts, although other types of conventional sensors can be used.

The engagement of piston 111 with bores 108 and 110 creates two hydraulic chambers between the piston 111 and the bores 108 and 110. The first chamber 180 is created on one side of seal 120 and the second chamber 182 is created on the other side of seal 120. Each of chambers 180 and 182 is operatively connected to a hydraulic supply, as is conventionally available on turret utilizing machine tools. Supplying pressurized hydraulic fluid to chamber 180 forces the piston 111 and thus the bevel drive gear 80, to move toward the retracted position. The travel of the piston 111 can be limited by the contact of the step 184 in the outer surface of the piston 111 with the surface of housing 102. Alternatively, one or more adjustable shoulderless limit screws can be provided to engage the collar 152 and the housing 102, similarly to screws 156, to limit travel of the piston in toward the retracted position. Other known types of travel limiters, adjustable or not, can also be provided.

Removing the supply of pressurized hydraulic fluid from either chamber causes the piston 111, and thus the bevel drive gear 80, to move toward the engaged position because of the biasing force supplied by the springs 160. Supplying pressurized hydraulic fluid to chamber 182 will supply additional biasing force to the piston 111, and thus the bevel drive gear 80, toward the engaged position. This additional biasing force is utilized to maintain the bevel drive gear 80 in proper driving engagement with bevel drive gear 50 and to overcome the natural driving forces which would otherwise act to force the bevel gears apart when the live tool 48 is performing a machining operation.

Figure 8:
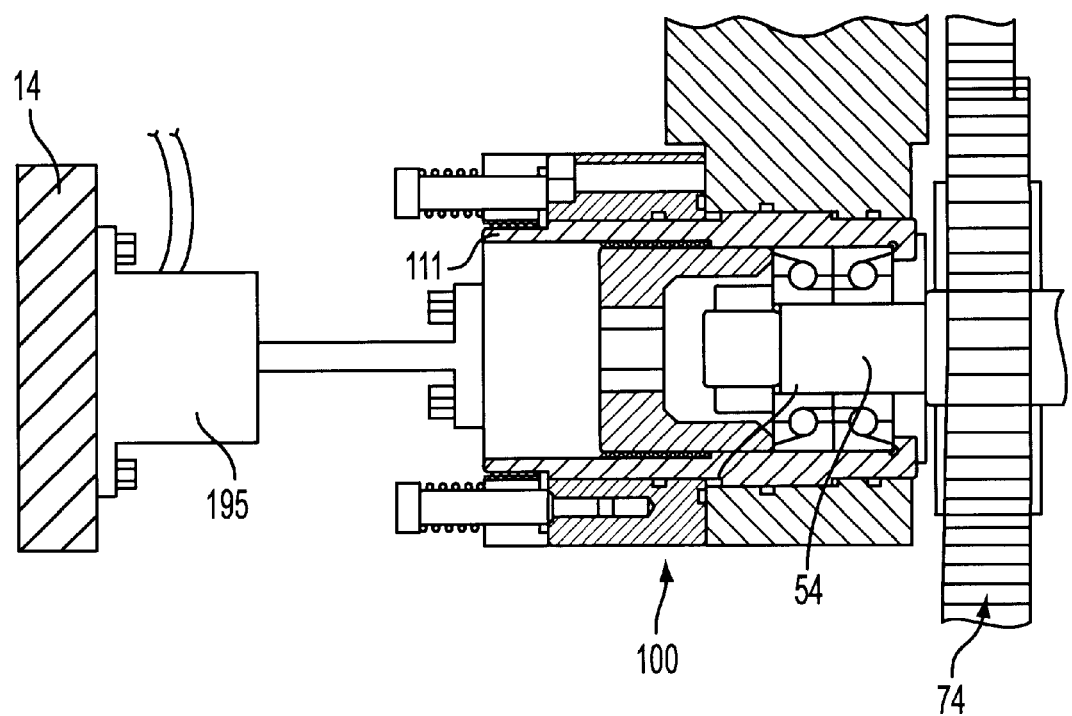
FIG. 8 is a sectional view of the tooling plate lifting mechanism of the present invention.

Alternatively, other types of mechanical, hydraulic, pneumatic, electrical or electromechanical types of actuators can be attached to the piston 111 or other component in the axially movable assembly and utilized to provide movement and biasing force in either direction. FIG. 8 shows such an embodiment where an actuator 195 is mounted between the turret housing 14 and the collar 152 to axially move and bias the driveshaft 76.

The travel of piston 111 toward the engaged position is limited by the contact of collar 152 with housing 102. The engagement travel limit is adjustable due to the threaded engagement of piston 111 with collar 152. The setscrews 174 are first backed out of engagement with piston 111. A hex tool is then inserted into hex bore 150 of inner nut 144. Since the force required to loosen the inner nut 144 with respect to piston 111 is generally greater than the force required to rotate the piston 111 with respect to the housing 102, turret housing 14, etc., the hex tool can be generally used to rotate the piston in either direction. Because of the threaded engagement of the piston 111 with respect to the collar 152, rotation of the piston 111 with respect to the collar 152 causes the piston 111 to move axially with respect to the collar 152. The direction of axial movement will depend on the direction of rotation and whether the threaded engagement uses a right-hand or left-hand thread. In the preferred embodiment, an M50×1 mm thread is used to provide for fine axial adjustability of the piston 111. Different threads can also be utilized.

The piston 111 is rotated and the piston correspondingly moved axially until the desired backlash is obtained between the bevel drive gear 80 and the bevel drive gear 50 when the two gears are in the engaged position. When the desired backlash is obtained, which can be determined by conventional methods, the setscrews 174 are then retightened against the piston 111 to maintain that setting. The backlash can also be adjusted by removing the screws 156 and springs 160 and rotating the collar 152 with respect to the piston 111. After the desired backlash is obtained, the setscrews can be tightened down and the collar 152 aligned with the housing 102 so that the screws 156 and springs 160 can be reinstalled. If necessary, the sensor 170 is repositionable with respect to the collar 152.

The indexing tool turret of the present invention operates as follows. To index the tool plate, index shaft 42 and tooling plate 44 are lifted from the position shown in FIG. 2 to the position shown in FIG. 3 by the lifting mechanism. The driveshaft 76 and bevel drive gear 80 are retracted by the retracting mechanism 100 to the position shown in FIG. 3. When the retract sensor 172 senses that the driveshaft is retracted, the clutch mechanism 20 is engaged (see FIG. 3) and the drive unit 12 started to transmit torque through the speed reducing mechanism 26 to the torque limiting mechanism 34, which in turn rotates the tooling plate 44 through the drive gears 36 and 40 and index shaft 42. The tooling plate is then rotated until the desired tool station is properly indexed, as is sensed by conventional encoding mechanisms. The variable speed and reversible drive unit 12 allows bi-directional indexing following the shortest path and further allows the live tooling to be bi-directionally driven at variable speeds.

The speed reducing mechanism 26 operates in conjunction with the various gear ratios present in the indexing drive train to reduce the speed at which the tooling plate 44 indexes in comparison to the speed of rotation of the live tool 48. In the preferred embodiment, the final drive ratio through the indexing drive train to the tooling plate 44 is approximately 22/1, whereas the final drive ratio through the live tool drive train to the live tool 48 is approximately 1/1.

Figure 6:
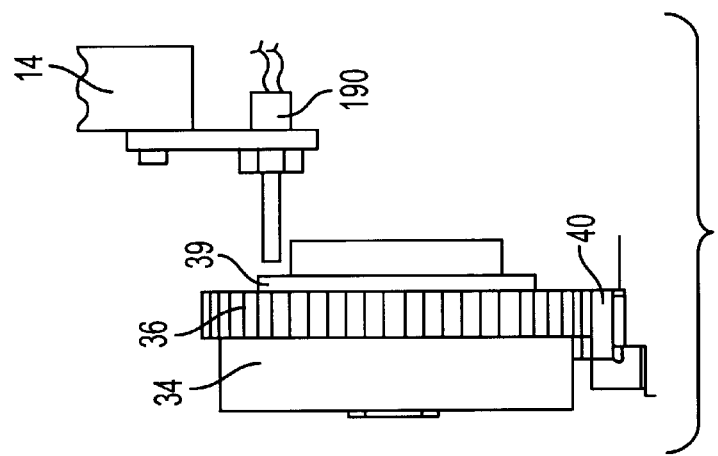
FIG. 6 is a detailed side elevational view of the torque limiting mechanism of the present invention.

The torque limiting mechanism 34 ratchets when a torque overload is encountered, such as when the tooling plate strikes an object while indexing (crashes) or when the indexed tool has not been properly retracted from the workpiece prior to indexing. The ratcheting operates to limit the torque transmitted from the drive unit 12 to the tooling plate 44 (and vice-versa). The operation of the torque limiting mechanism 34 when a torque overload is encountered is such that a plate 39 of the torque limiting mechanism is pushed outward from the mechanism (to the right in FIG. 6). A proximity sensor 190 is mounted to the turret housing 14 and positioned with respect to the torque limiting mechanism 34 so as to sense when the plate 39 has been pushed outward, indicating that a torque overload has been encountered. Upon sensing such an occurrence, the proximity sensor 190 sends a signal to shut down the machine tool until the cause of the torque overload is determined and rectified. The tripping of the torque limiting mechanism and the shutting down of the machine in response to the trip signal helps to prevent further damage to the drive unit, drive train, tooling plate, and tools. The possibility of crashing is increased in a machine tool having more than one tool turret, so this feature is especially desirable in such machines.

When the tooling plate is properly indexed, it is lowered by the lifting mechanism and locked in place. The clutch mechanism 20 is then operated to disengage the drive unit from the tooling plate 44 (see FIG. 2). The pressurized hydraulic fluid supply is then removed from chamber 180 so that the biasing force from springs 160 move the driveshaft 76 and bevel drive gear 80 toward the engaged position. The springs are designed to have less biasing force than the hydraulic locking mechanism. Therefore, the use of the springs as opposed to the hydraulic mechanism to perform the initial engagement of the bevel drive gears is preferred, because it limits excessive engaging force which might damage the bevel drive gears or other components.

The engage sensor 170 then determines if the bevel drive gear 80 has properly engaged the bevel drive gear 50. If not, the drive unit is engaged to slowly turn the bevel drive gear 80 through the gears 70, 72 and 74 and driveshaft 76 until the engage sensor determines that the bevel drive gear 80 has properly engaged the bevel drive gear 50, whereupon, the drive unit 12 is shut down in response to the signal from the engage sensor 170. Once the engage sensor 170 determines that the bevel drive gears are properly engaged and the drive unit is shut down, pressurized hydraulic fluid supply is connected to the chamber 182 to bias the piston 111 toward the engaged position to maintain the engagement of the bevel drive gears during machining operations. At this point the drive unit can be started to drive the live tooling.

In the preferred method, the above described operations are automatically sequentially controlled as predetermined and in response to the discussed signals by a computer, machine controller or other logic device. The operations can also be manually controlled in the desired sequence and, if desired, in response to the discussed signals and provisions can be made for manually overriding the automatic controls.

Figure 7:
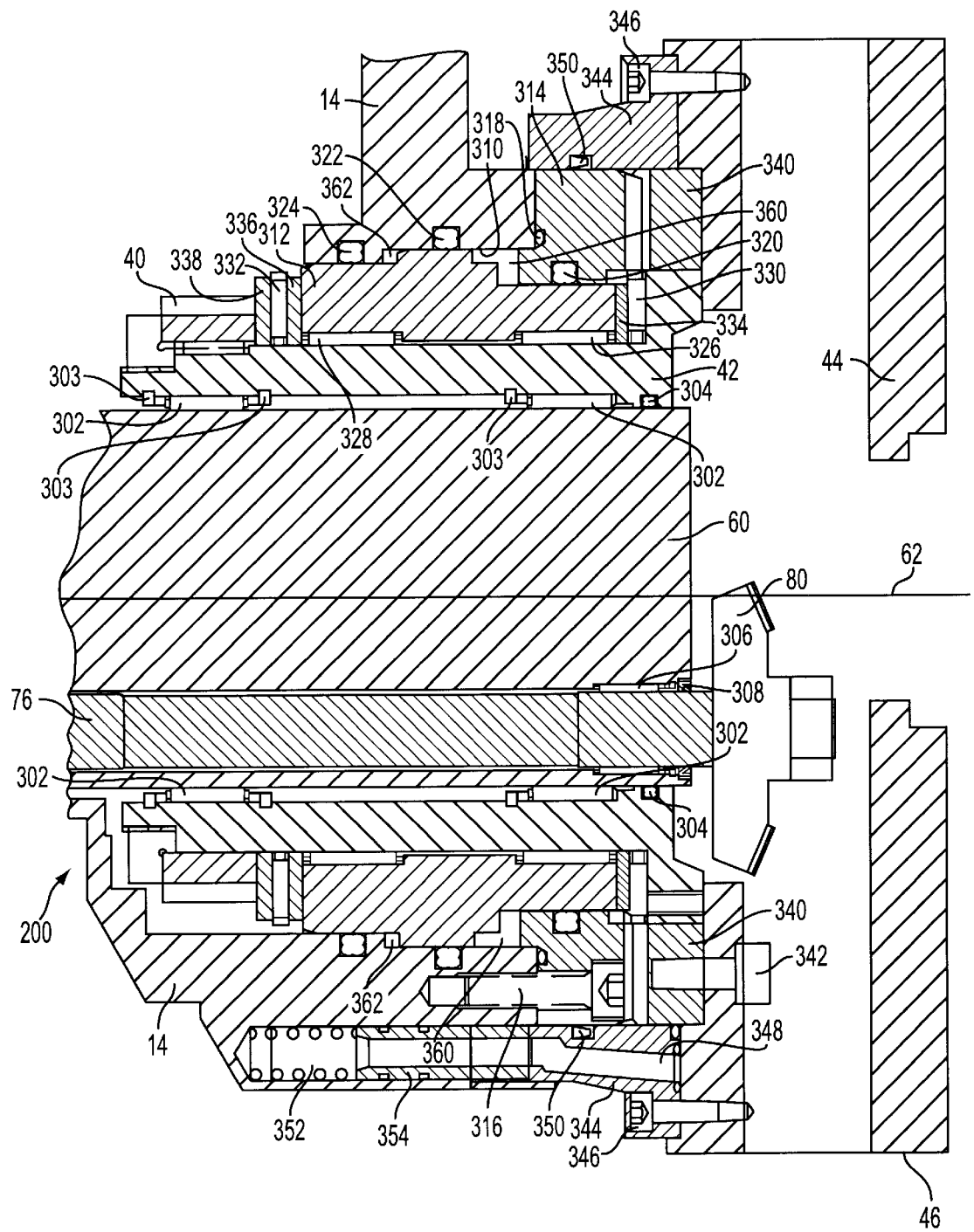
FIG. 7 is a detailed sectional view of the tooling plate lifting mechanism of the present invention.

A tool turret lifting mechanism, generally indicated at 200, is disclosed in FIG. 7. Index shaft 42 is rotatably mounted on hub 60 by needle bearings 302 and seal 304 provides a sealing arrangement between the index shaft 42 and hub 60. Retaining rings 303 retain the bearings 302 in place in the index shaft 42. Driveshaft 76 is rotatably mounted in hub 60 by needle bearings 306 and seal 308 provides a sealing arrangement between the driveshaft 76 and hub 60. Turret housing 14 includes a stepped bore 310, in which is disposed an axially movable piston 312. Although positioning bore 310 directly in the turret housing 14 is presently the preferred embodiment, the bore could also be positioned in a replaceable sleeve mounted to housing 14.

An inner face gear 314 is mounted to turret housing 14 by a plurality of screws 316 and encloses bore 310 with respect to piston 312. Seals 318, 320, 322 and 324 provide a sealing arrangement between housing 14, inner face gear 314 and piston 312. Index shaft 42 is rotatably supported with respect to piston 312 by needle bearings 326 and 328. Needle bearings 330 and 332 and thrust washers 334, 336 and 338 mounted between the index shaft 42, piston 312 and drive gear 40 provide axial thrust support to tooling plate 44 mounted to index shaft 42. An outer face gear 340 is mounted to tooling plate 44 by a plurality of screws 342 and adapted to indexingly engage inner face gear 314.

A coolant housing 344 is mounted to the tooling plate 44 by a plurality of screws 346 and includes a plurality of coolant flow ports 348. Generally, a coolant flow port is provided for each tool station 46 and provides for coolant flow to the indexed tool. A seal 350 provides a sealing arrangement between the coolant housing 344 and inner face gear 314. A coolant supply port 352 is connected to a coolant source and is adapted to provide coolant to the indexed coolant flow port. Coolant supply port 352 includes a spring-loaded sealing tube 354 for providing a sealing relationship between coolant supply port 352 and the indexed coolant flow port 348.

The mating relationship between the turret housing 14, inner face gear 314 and piston 312 creates two chambers 360 and 362. The first chamber 360 is created on one side of seal 322 and the second chamber 362 is created on the other side of seal 322. Each of chambers 360 and 362 is operatively connected to a hydraulic supply, as is conventionally available on turret utilizing machine tools. Supplying pressurized hydraulic fluid to chamber 360 forces the piston 312, and thus the tooling plate 44, to move toward the retracted (lowered) position. Supplying pressurized hydraulic fluid to chamber 362 forces the piston 312, and thus the tooling plate 44, to move toward the disengaged (raised) position. The surface area of the piston perpendicular to axis 62 is greater in chamber 360 than in chamber 362. Thus, the force that can be exerted on the piston 312 by the supply of pressurized hydraulic fluid to the chambers is greater toward the retracted position than toward the disengaged position, all other things being equal.

To raise the tooling plate 44, the supply of pressurized hydraulic fluid is removed from chamber 360 and supplied to chamber 362, thereby moving the piston 312, and thus tooling plate 44, to the right as seen in FIG. 7. This also disengages the face gears 314 and 340, thereby allowing rotation of the tooling plate 44. The tooling plate can then be indexed (rotated) as discussed above until the desired index is achieved. A conventional encoding mechanism is used to determine that the proper indexing has been achieved.

To lower the tooling plate 44, the supply of pressurized hydraulic fluid is removed from chamber 362 and supplied to chamber 360, thereby moving the piston 312, and thus tooling plate 44, to the left as seen in FIG. 7. This also reengages the face gears 314 and 340, thereby preventing further rotation of the tooling plate 44 until it is raised again. The continuing supply of pressurized hydraulic fluid to chamber 360 retains and locks the tooling plate 44 in the lowered position. If desired, the pressurized hydraulic fluid supplied to chamber 360 to lower the tooling plate can be initially supplied at a lower pressure to more gently lower the tooling plate and reengage the face gears. Then, the pressure of the hydraulic fluid can be increased to more securely lock the tooling plate in the lowered position.

Other known lifting and locking mechanisms can also be utilized with the present invention, such as the mechanism disclosed in Smith, U.S. Pat. No. 4,656,708, owned by the same assignee as the present invention and incorporated herein by reference.

While this invention has been described in connection with what is presently considered to be the most practical and preferred embodiment, it is to be understood that it is capable of further modifications and is not to be limited to the disclosed embodiment, and this application is intended to cover any variations, uses, equivalent arrangements or adaptations of the invention following, in general, the principles of the invention and including such departures from the present disclosure as come within known or customary practice in the art to which the invention pertains, and as may be applied to the essential features hereinbefore set forth and followed in the spirit and scope of the appended claims.

We claim:

1. An indexing tool turret assembly, comprising:
    a drive unit;
    a tooling plate including a plurality of tool stations for simultaneously supporting a plurality of live tools, wherein the tooling plate is movable between an operating position and an indexing position, wherein the tooling plate is rotatable about a tooling plate axis, wherein the tooling plate has a rotatable tooling plate gear;
    an indexing drive train selectively operatively connected between the drive unit and the tooling plate to allow the drive unit to rotate the tooling plate to index one of the plurality of tool stations during an indexing operation when the tooling plate is in the indexing position, wherein the indexing drive train includes an indexing drive train gear engageable with the tooling plate gear, wherein the indexing drive train is laterally spaced from the tooling plate axis; and
    a live tool drive train selectively operatively connected between the drive unit and the indexed tool station to provide drive to the indexed tool station, wherein the live tool drive train provides drive to only the indexed one of the plurality of tool stations at a given time, wherein the live tool drive train includes a rotatable tool drive shaft having a drive gear located on one end, wherein the rotatable tool drive shaft extends in a longitudinal direction and the rotatable tool drive shaft is laterally spaced from the tooling plate axis and the indexing drive train, wherein the drive gear is selectively engageable with one of the plurality of tool stations at a given time, wherein the rotatable tool drive shaft is selectively displaceable in the longitudinal direction via a retracting mechanism between an extended operating position wherein the live tool drive shaft is in operable engagement with one of the tool stations and a retracted indexing position, wherein the drive gear is laterally spaced from the indexing drive train gear, wherein the indexing drive gear is distinct from the live tool drive train.

2. An indexing tool turret assembly as in claim 1, wherein the indexing drive train includes a clutch mechanism for selectively engaging and disengaging a driving connection between the drive unit and the tooling plate.

3. An indexing tool turret assembly as in claim 2, wherein the clutch mechanism is a pneumatically operated clutch mechanism.

4. An indexing tool turret assembly as in claim 1, wherein the indexing tool turret assembly further comprises:
    a hub fixedly mounted with respect to the tool turret assembly and having a hub axis, wherein the tooling plate is rotationally mounted on the hub to rotate about the hub axis.

5. An indexing tool turret assembly as in claim 4, wherein the tool driveshaft includes:
    a gear for operatively engaging the drive unit mounted toward a first end of the tool driveshaft; and
    the drive gear mounted at a second end of the tool driveshaft for operatively engaging a live tool bevel gear of a live tool mounted at the indexed tool station for transmitting a drive torque from the drive unit to the live tool.

6. An indexing tool turret assembly as in claim 5, wherein the tool driveshaft is selectively axially displaceable along the tool driveshaft axis to selectively engage and disengage the drive gear with the live tool bevel gear.

7. An indexing tool turret assembly as in claim 6, and wherein:
    the tool driveshaft retracting mechanism is connected between a fixed portion of the tool turret assembly and the tool driveshaft to axially displace the tool driveshaft along the tool driveshaft axis.

8. An indexing tool turret assembly as in claim 7, wherein the tool driveshaft retracting mechanism includes:

a housing;

an internal bore at least partially disposed in the housing having a first stepped portion;

a piston having a first stepped outer portion, a portion of the piston disposed in the internal bore, the piston connected to the tool driveshaft for axial movement in the internal bore;

a first hydraulic chamber formed between the first stepped portion of the internal bore and the first stepped portion of the piston, the first hydraulic chamber operatively selectively connected to a pressurized hydraulic source, such that connecting the first hydraulic chamber to the pressurized hydraulic source causes the piston and the tool driveshaft to move in a first axial direction;

a first biasing mechanism connected to the piston for moving the piston and tool driveshaft in a second axial direction upon disconnecting the pressurized hydraulic source from the first hydraulic chamber.

9. An indexing tool turret assembly, comprising:

a drive unit;

a tooling plate including a plurality of tool stations for simultaneously supporting a plurality of live tools, wherein the tooling plate is movable between an operating position and an indexing position;

an indexing drive train selectively operatively connected between the drive unit and the tooling plate to allow the drive unit to rotate the tooling plate to index one of the plurality of tool stations during an indexing operation when the tooling plate is in the indexing position;

a live tool drive train selectively operatively connected between the drive unit and the indexed tool station to provide drive to the indexed tool station, wherein the live tool drive train provides drive to only the indexed one of the plurality of tool stations at a given time, wherein the live tool drive train includes a tool drive shaft extending in a longitudinal direction and the tool drive shaft is laterally spaced from the indexing drive train, wherein the tool drive shaft is displaceable in the longitudinal direction between an extended operating position wherein the live tool drive shaft is in operable engagement with one of the tool stations and a retracted indexing position, wherein the indexing tool turret assembly further comprises a hub fixedly mounted with respect to the tool turret assembly and having a hub axis, wherein the tooling plate is rotationally mounted on the hub to rotate about the hub axis, wherein the tool driveshaft is rotatable about an axis parallel to and offset from the hub axis, wherein the tool driveshaft includes, a gear for operatively engaging the drive unit mounted toward a first end of the tool driveshaft, and a bevel gear mounted at a second end of the tool driveshaft for operatively engaging a live tool bevel gear of a live tool mounted at the indexed tool station for transmitting a drive torque from the drive unit to the live tool, wherein the tool driveshaft is selectively axially displaceable along the tool driveshaft axis to selectively engage and disengage the tool driveshaft bevel gear with the live tool bevel gear; and a tool driveshaft retracting mechanism connected between a fixed portion of the tool turret assembly and the tool driveshaft to axially displace the tool driveshaft along the tool driveshaft axis, wherein the tool driveshaft retracting mechanism includes a housing, an internal bore at least partially disposed in the housing having a first stepped portion, a piston having a first stepped outer portion, a portion of the piston disposed in the internal bore, the piston connected to the tool driveshaft for axial movement in the internal bore, a first hydraulic chamber formed between the first stepped portion of the internal bore and the first stepped portion of the piston, the first hydraulic chamber operatively selectively connected to a pressurized hydraulic source, such that connecting the first hydraulic chamber to the pressurized hydraulic source causes the piston and the tool driveshaft to move in a first axial direction, a first biasing mechanism connected to the piston for moving the piston and tool driveshaft in a second axial direction upon disconnecting the pressurized hydraulic source from the first hydraulic chamber, wherein the tool driveshaft retracting mechanism further includes a backlash adjusting mechanism for adjusting a backlash between the tool driveshaft bevel gear and the live tool bevel gear, wherein the backlash adjusting mechanism includes:

a collar having a threaded inner axial bore and a lower engaging surface to engage a surface of the drive shaft retracting mechanism housing; and a retaining mechanism for retaining the collar in engagement with the housing;

wherein the piston includes a threaded outer portion for threadably engaging the threaded inner bore of the collar and whereby rotation of the collar with respect to the piston varies the threaded engagement and the axial positioning of the piston with respect to the collar to adjust the backlash between the tool driveshaft bevel gear and the live tool bevel gear.

10. An indexing tool turret assembly as in claim 9, wherein the indexing drive train includes a speed reduction mechanism to reduce a speed of rotation between the drive unit and the tooling plate.

11. An indexing tool turret assembly as in claim 9, wherein the indexing drive train includes a torque limiting mechanism to limit an amount of torque that can be applied by the drive unit to the tooling plate.

12. An indexing tool turret assembly as in claim 11, wherein the torque limiting mechanism limits the applied torque to reduce damage to the tooling plate should one of the tooling plate and the live tools strike another object while indexing.

13. An indexing tool turret assembly as in claim 12, further including a sensor for sensing when the torque limiting mechanism has encountered an over-limit torque and in response thereto, sending a signal to shut down the drive.

14. An indexing tool turret assembly as in claim 7, wherein the sensor is a proximity sensor mounted in proximity to the torque limiting mechanism to sense movement of a portion of the torque limiting mechanism in response to the over-limit and send the shut-down signal.

15. An indexing tool turret assembly as in claim 9, wherein the first biasing mechanism includes at least one spring operatively connected between the housing and the piston to move the piston and the tool driveshaft in the second axial direction.

16. An indexing tool turret assembly as in claim 15, and further including:

a second biasing mechanism connected to the piston for biasing the piston and tool driveshaft in the second axial direction upon disconnecting the pressurized hydraulic source from the first hydraulic chamber.

17. An indexing tool turret assembly as in claim 16, wherein the second biasing mechanism includes a second hydraulic chamber formed between a second stepped portion of the piston and a second stepped portion of the internal bore and selectively operatively connected to the pressurized hydraulic source such that connecting the second hydraulic chamber to the pressurized hydraulic source causes the piston and the tool driveshaft to be biased in the second axial direction.

18. An indexing tool turret assembly as in claim 17, wherein the tool driveshaft retracting mechanism further includes at least one sensor to detect when the piston has moved in one of the first and second axial directions toward a stop position.

19. An indexing tool turret assembly as in claim 18, wherein the at least one sensor detects when the piston has moved in one of the first and second axial directions toward a stop position where the tool driveshaft bevel gear is disengaged with the live tool bevel gear and in response thereto, signal the indexing drive train to operatively engage the live tool.

20. An indexing tool turret assembly as in claim 19, wherein the second axial direction is in a direction toward engaging the tool driveshaft bevel gear and the live tool bevel gear, the tool driveshaft retracting mechanism further including a second sensor to detect when the piston has been moved in the second axial direction by the first biasing mechanism toward a stop position where the tool driveshaft bevel gear is fully engaged with the live tool bevel gear to a desired backlash and in response thereto, and signal the second biasing mechanism to engage to lock the tool driveshaft bevel gear and the live tool bevel gear in engagement with each other.

21. An indexing tool turret assembly as in claim 20, wherein the second sensor also detects when the tool driveshaft bevel gear is not fully engaged with the live tool gear to a desired backlash upon movement of the tool driveshaft in the second axial direction and in response thereto, and signal the drive unit to drive the live tool drive train at a reduced rate to turn the tool driveshaft bevel gear with respect to the live tool bevel gear until the two bevel gears properly mesh and engage to the desired backlash, the second sensor detects this engagement and in response thereto, signal the second biasing mechanism to engage to lock the tool driveshaft bevel gear and the live tool bevel gear in engagement with each other.

22. An indexing tool turret assembly as in claim 15, wherein the tool driveshaft retracting mechanism further includes at least one sensor to detect when the piston has moved in one of the first and second axial directions toward a stop position.

23. An indexing tool turret assembly as in claim 22, wherein at least one sensor detects when the piston has moved in one of the first and second axial directions toward a stop position where the tool driveshaft bevel gear is disengaged with the live tool bevel gear and in response thereto, signal the indexing drive train to operatively engage the live tool.

24. An indexing tool turret assembly as in claim 23, wherein the second axial direction is in a direction toward engaging the tool driveshaft bevel gear and the live tool bevel gear, the tool driveshaft retracting mechanism further including a second sensor to detect when the piston has been moved in the second axial direction by the first biasing mechanism toward a stop position where the tool driveshaft bevel gear is fully engaged with the live tool bevel gear to a desired backlash.

25. An indexing tool turret assembly as in claim 24, wherein the second sensor detects when the tool driveshaft bevel gear is not fully engaged with the live tool bevel gear to a desired backlash upon movement of the tool driveshaft in the second axial direction and in response thereto, signal the drive unit to drive the live tool drive train at a reduced rate to turn the tool driveshaft bevel gear with respect to the live tool bevel gear until the two bevel gears properly mesh and engage to the desired backlash.

26. An indexing tool turret assembly as in claim 25, and further including:
   a second biasing mechanism connected to the piston for biasing the piston and tool driveshaft in the second axial direction upon disconnecting the pressurized hydraulic source from the first hydraulic chamber, and wherein the second sensor, upon detecting that the bevel gears are fully engaged, signals the second biasing mechanism to engage to lock the tool driveshaft bevel gear and the live tool bevel gear in engagement with each other.

27. An indexing tool turret assembly as in claim 9, wherein the backlash adjusting mechanism further includes:
   at least one threaded set screw;
   the collar further including at least one threaded set screw bore passing through the collar from an outer surface of the collar to the inner threaded axial bore to threadably receive at least one threaded set screw;
   whereupon screwing the set screw into at least one threaded set screw bore causes the set screw to engage a portion of the piston and lock the piston with respect to the collar to maintain the adjusted backlash.

28. An indexing tool turret assembly as in claim 27, wherein the first biasing mechanism is connected between the housing and the collar.

29. An indexing tool turret assembly as in claim 28, wherein the first biasing mechanism includes:
   at least one bolt engaging the housing; and
   a compression spring mounted between at least one bolt and an upper surface of the collar.

30. An indexing tool turret assembly as in claim 9, and further including a tool turret lifting mechanism including:
   a turret housing fixedly mounted with respect to the tool turret assembly;
   an inner circular face gear mounted to the turret housing;
   an outer circular face gear mounted to the tooling plate to selectively axially engage the inner circular face gear and rotationally lock the tooling plate with respect to the turret housing;
   a first tooling plate biasing mechanism mounted between the turret housing and the tooling plate for lowering and providing a biasing force to the tooling plate with respect to the turret housing to engage the circular face gears and rotationally lock the tooling plate with respect to the turret housing; and
   a second tooling plate biasing mechanism mounted between the turret housing and the tooling plate for lifting the tooling plate with respect to the turret housing to disengage the circular face gears and allow the tooling plate to rotate with respect to the turret housing.

31. An indexing tool turret assembly as in claim 30, wherein the first tooling plate biasing mechanism is a hydraulic cylinder selectively connected to a pressurized hydraulic supply.

32. An indexing tool turret assembly as in claim 30, wherein the second tooling plate biasing mechanism is a hydraulic cylinder selectively connected to a pressurized hydraulic supply.

33. An indexing tool turret assembly as in claim 32, wherein the first tooling plate biasing mechanism is a hydraulic cylinder selectively connected to a pressurized hydraulic supply.

34. An indexing tool turret assembly as in claim 33, wherein the first tooling plate biasing mechanism includes:
 a first axial bore at least partially disposed in the turret housing;
 a first piston disposed in the first axial bore for axial movement in the first axial bore, the first piston having an inner axial piston bore through which the hub is disposed; and
 a first hydraulic chamber created between the first axial bore at least partially disposed in the turret housing and the piston wherein the first hydraulic chamber is selectively connected to the pressurized hydraulic supply;
 wherein, the tooling plate is rotationally mounted between the hub and the first piston to rotate about the hub axis.

35. An indexing tool turret assembly as in claim 34, wherein the second tooling plate biasing mechanism includes:
 a second hydraulic chamber created between the first axial bore and the piston selectively connected to the pressurized hydraulic supply.

36. An indexing tool turret assembly as in claim 34, wherein the second hydraulic chamber is displaced axially from the first hydraulic chamber.

37. An indexing tool turret assembly as in claim 36, wherein the first axial bore includes a first stepped portion and the first piston includes a first piston stepped portion opposing the first stepped portion in the first axial bore and the first hydraulic chamber is created between the first stepped portion and the first piston stepped portion.

38. An indexing tool turret assembly as in claim 37, wherein the first axial bore includes a second stepped portion and the first piston includes a second piston stepped portion opposing the second stepped portion in the first axial bore and the second hydraulic chamber is created between the second stepped portion and the second piston stepped portion.

39. An indexing tool turret assembly as in claim 30, and further including:
 a coolant supply port disposed in the turret housing to supply coolant from a coolant supply to the tooling plate;
 a plurality of tooling plate coolant flow ports disposed in the tooling plate for selective connection to the coolant supply port; and
 a flexible sealing mechanism disposed between the coolant supply port and the respective selected tooling plate coolant flow port to provide a connection between the coolant supply port and the respective selected tooling plate coolant flow port.

40. An indexing tool turret assembly as in claim 30, wherein the flexible sealing mechanism includes an axially movable spring-loaded tube, wherein the spring-loaded tube is axially movable between at least one of the coolant supply port and the respective selected tooling plate coolant flow port.

\* \* \* \* \*